June 4, 1935.  D. W. RANDOLPH ET AL  2,003,467

SPARK PLUG ELECTRODE

Filed June 30, 1933

Inventors
Donald W. Randolph
& Jay T. Ford.
By Blackmore, Spencer & Flint
Attorneys Patented June 4, 1935

2,003,467

UNITED STATES PATENT OFFICE 2,003,467

SPARK PLUG ELECTRODE

Donald W. Randolph and Jay T. Ford, Flint, Mich., assignors, by mesne assignments, to General Motors Corporation, Detroit, Mich., a corporation of Delaware Application June 30, 1933, Serial No. 678,342

2 Claims. (Cl. 219—10)

In the manufacture of spark plugs difficulty was experienced in welding the electrodes to the shell especially where cromium was included in the composition of the electrodes. After many unsuccessful attempts to solve the problem, studies were made of the resistance in the portion of the welding circuit including the welding jaws and the parts to be welded. It was found that where difficulty was experienced the resistance was abnormally high, and upon further study, it was found that the increased resistance was due to an oxide film which prevented good contact with the welding jaws. The resistance of this film was found to be especially high where cromium alloys were used, but in the case of all metals studied oxidation increased the resistance of the welding circuit and made welding more difficult.

With the difficulty correctly analyzed, the problem was then presented of treating the electrodes, first to remove the oxide film, and second to protect them against re-oxidation prior to the welding. The first problem was readily solved by employing any of the well-known cleaning baths or processes known in the art, and the second was solved by providing the part immediately after cleaning with a coating that is not subject to oxidation. This coating is preferably accomplished by plating with a suitable metal. Obviously it is preferable to apply the coating to the metal whose oxidation interferes most with the welding, but some advantage may be obtained by applying it to either of the parts to be joined.

While the invention was made in solving the specific problem of welding electrodes to spark plugs, and is especially applicable to the materials there used, it is obvious that it is of general scope, and may be employed in the welding of any kind of materials, and in the welding of parts of any shape.

Figure 2:
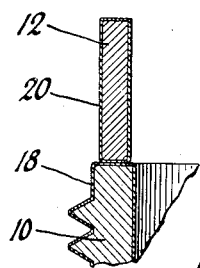
Figure 2 is a section through the parts before welding.
Figure 3:
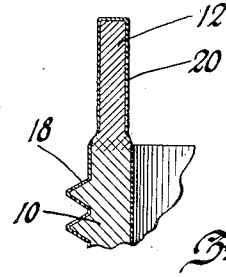
Figure 3 is a section through the parts after welding.

In Figures 2 and 3 the platings are shown greatly exaggerated in thickness.

Figure 1:
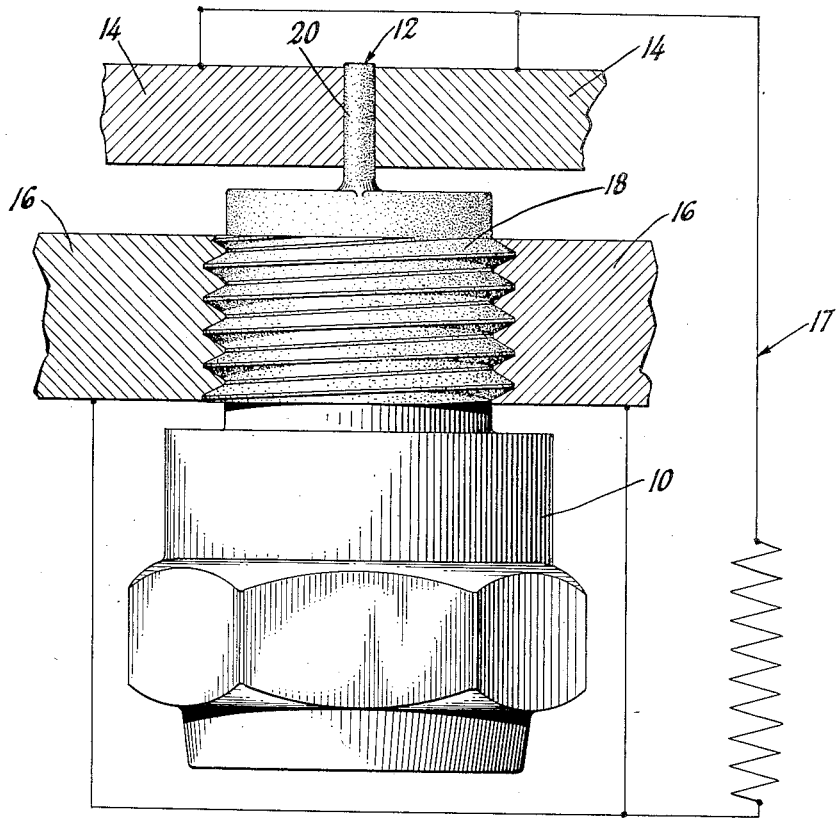
Figure 1 is a diagrammatic view showing the welding of a side electrode to a spark plug shell.

In Figure 1, 10 indicates the spark plug shell preferably made of steel and 12 indicates the side electrode. 14 indicates the welding jaws which hold the side electrode wire, and 16 indicates the welding jaws which grip the shell. In practice the jaws 16 are movable toward the jaws 14 so as to bring the shell into contact with the side electrode for welding as shown in the figure. 17 indicates the welding circuit which may be supplied with current from a suitable transformer of which only the secondary is shown, the circuit is provided with suitable switches to control the flow of current.

Both the shell and the electrode are provided with coatings 18 and 20, respectively, of material that is not readily oxidizable. The coatings may be applied in any preferred manner, preferably by electro-plating. We have found copper to be cheapest and best, but have used tin, zinc, cadmium, and silver with success. Where rather readily oxidizable metals like zinc are employed, the welding must be done very promptly after plating.

The coatings are applied to protect the pieces from oxidization, but before they are applied it is essential to thoroughly clean the pieces to remove oxides. This may be done by using suitable alkaline or acid cleaning baths, with or without the aid of electrolysis. The cleaning operation should be promptly followed by coating to prevent oxidation.

By referring to the section shown in Figure 3 it will be noted that the strength of the weld lies in the union of the base metals of the shell and electrode and not in the union of the coatings. Where copper is used as the coating metal it will be found that it is burned away by the welding heat. This will be true of most coatings of low melting point metals.

While we have shown both of the pieces coated as described, in practice it is necessary to coat but one, preferably the electrode wire, for this, owing to its chromium content, possesses a film having the higher resistance. Coating one of the parts lowers the resistance through the welding circuit to a sufficient degree to permit a good weld to be made, but by coating both parts the resistance is lowered still further and welding is made easier. We prefer to use an electrode wire made of an alloy of chromium, nickel, manganese and barium described and claimed in the prior application of D. W. Randolph, S. N. 609,773, filed May 6, 1932.

We have used this method of welding with articles of many shapes and compositions, but of course have found it to be of the greatest advantage where the oxide film is of such composition as to offer considerable resistance to flow of the welding current. In the welding operation illustrated the contact between the welding jaws and the electrode is the poorest because of the shape of the parts, so it is preferable to apply the coating to the electrode. It will be understood, however, that the oxide film also increases the resistance at the welding contact but the resistance here is lower because of the relatively good contact.

We claim:

1. The method of welding metal parts one of which contains chromium, a portion of the chromium appearing on the surface as a constituent of an oxide film of high electrical resistance which consists in cleaning said part to remove the oxide film, coating the clean metal with a material which is not readily oxidized, assembling the parts, and passing electrical current through the parts to produce the weld.

2. The method of welding metal parts one of which consists of an alloy containing chromium and being highly resistant to rust and corrosion, a portion of the chromium appearing on the surface as a constituent of an oxide film of high electrical resistance, which consists in cleaning said part to remove the oxide film, coating the clean metal with a metal such as copper which is not readily oxidized, assembling the parts, and passing electrical current through the parts to produce the weld.

DONALD W. RANDOLPH.
JAY T. FORD.